US008310966B2

(12) United States Patent
Toshida

(10) Patent No.: US 8,310,966 B2
(45) Date of Patent: Nov. 13, 2012

(54) WIRELESS COMMUNICATION SYSTEM, WIRELESS BASE STATION, TRANSMISSION RATE DETERMINING METHOD, AND PROGRAM FOR WIRELESS COMMUNICATION SYSTEM

(75) Inventor: Ryuichi Toshida, Tokyo (JP)

(73) Assignee: NEC Infrontia Corporation, Kawasaki, Kanagawa (JP)

( * ) Notice: Subject to any disclaimer, the term of this patent is extended or adjusted under 35 U.S.C. 154(b) by 1263 days.

(21) Appl. No.: 11/724,323

(22) Filed: Mar. 15, 2007

(65) Prior Publication Data

US 2007/0217334 A1   Sep. 20, 2007

(30) Foreign Application Priority Data

Mar. 16, 2006 (JP) ................................. 2006-073315

(51) Int. Cl.
 *H04B 7/00* (2006.01)
(52) U.S. Cl. ........ 370/310; 370/229; 370/235; 370/328; 370/338
(58) Field of Classification Search .................. 370/230, 370/235, 310, 320, 229, 328, 338, 232, 231; 379/93.08, 100.17; 375/225
See application file for complete search history.

(56) References Cited

U.S. PATENT DOCUMENTS

| 6,219,343 | B1 * | 4/2001 | Honkasalo et al. ........... 370/335 |
| 7,171,165 | B2 | 1/2007 | Azman et al. |
| 7,194,280 | B2 | 3/2007 | Vanghi |
| 7,257,408 | B2 | 8/2007 | Kikuchi et al. |
| 2005/0153702 | A1 * | 7/2005 | Cuffaro et al. ............. 455/452.1 |
| 2006/0159120 | A1 * | 7/2006 | Klm ............................. 370/465 |

FOREIGN PATENT DOCUMENTS

| JP | 11-331123 | 11/1999 |
| JP | 2003-520485 (A) | 7/2003 |
| JP | 2005-45811(A) | 2/2005 |
| JP | 2005-136507 (A) | 5/2005 |
| WO | WO 2005/002253 A1 | 1/2005 |

OTHER PUBLICATIONS

Japanese Office Action dated Mar. 8, 2011 with a partial English translation.

* cited by examiner

*Primary Examiner* — Kathy Wang-Hurst
(74) *Attorney, Agent, or Firm* — McGinn IP Law Group, PLLC

(57) ABSTRACT

By more flexibly controlling connection for each transmission rate in the wireless base station, the connection is established using possibly a higher transmission rate so long as the connection capacity of the wireless base station has a margin while efficiently determining the transmission rate according to the wave intensity from a wireless communication terminal. If the connection capacity of the base station has a margin after additionally connecting one wireless communication terminal, i.e., if the communication traffic is equal to or less than a predetermined margin threshold value, the rate decision threshold value to determine the transmission rate for connection is lowered by a predetermined value to determine a transmission rate so that the connection is established using a transmission rate higher than that determined by the rate decision threshold value as the default value (initial value) to thereafter establish the connection.

7 Claims, 4 Drawing Sheets

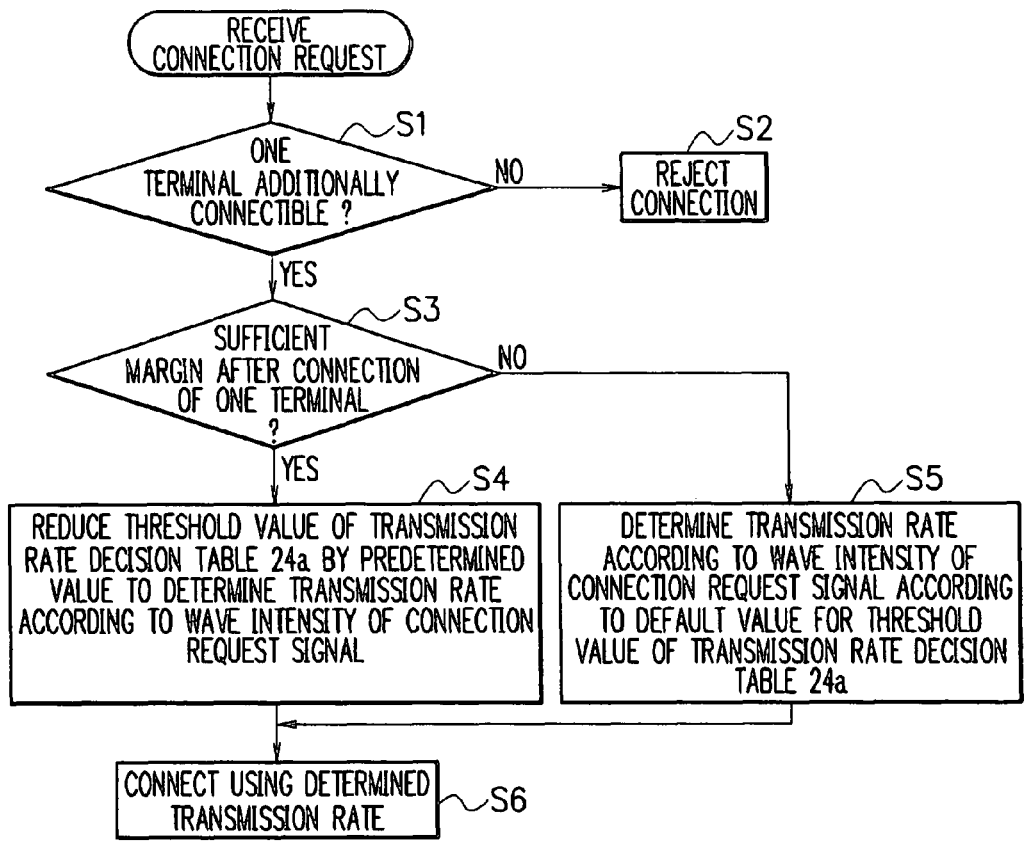

WIRELESS COMMUNICATION SYSTEM, WIRELESS BASE STATION, TRANSMISSION RATE DETERMINING METHOD, AND PROGRAM FOR WIRELESS COMMUNICATION SYSTEM

BACKGROUND OF THE INVENTION

1. Field of the Invention

The present invention relates to a wireless communication system, a wireless base station, a transmission rate determining method, and a program for wireless communication system supporting a plurality of transmission rates in wireless communication.

2. Description of the Related Art

A wireless communication system such as a wireless Local Area Network (LAN) has carried out multi-rate communication in which a plurality of transmission rates is supported.

For example, IEEE802.11b standard prescribes four transmission rates including 11 Megabits per second (Mbps), 5.5 Mbps, 2 Mbps, and 1 Mbps for the wireless LAN. IEEE802.11a standard defines eight transmission rates, namely, 54, 48, 36, 24, 18, 12, 9, and 6 Mbps in which 54, 48, 36, 28, and 9 Mbps are optional.

The multi-rate communication has a basic aspect that if the transmission rate becomes lower, the communicable distance can be elongated. Therefore, as shown in FIG. 1, the wireless base station communicates with a nearby wireless terminal at a higher transmission rate. For farther wireless terminals, the base station uses a lower transmission rate, thereby conducting efficient wireless communication in a wide area.

In general, when the transmission rate dynamically varies in the multi-rate communication, it is difficult to correctly calculate a band to be employed or occupied for each communication. Therefore, to secure the quality of sound and voice in the wireless communication especially when a wireless audio terminal is utilized, there has been used a method to fix a transmission rate, as shown in FIG. 1, that is assigned according to electric wave intensity.

The transmission rates to be allocated by the base station are determined beforehand using values obtained through experiences.

In this connection, for example, document 1 (Japanese Patent Application Laid-Open No. 11-331123) describes a technique for a conventional Code Division Multiple Access (CDMA) communication system in which, if a base station recognizes that the traffic for communication through the base station has a margin, the base station establishes a plurality of communication links with mobile stations.

However, in the conventional wireless communication system employing the multi-rate communication, the connection is established using a transmission rate determined beforehand according to the wave intensity. Therefore, even if the traffic is, for example, small and hence the connection capacity of the wireless base station has a margin, the connection is disadvantageously established using the predetermined transmission rate. That is, even in a situation in which the connection can be made using a higher transmission rate if the connection capacity of the base station is fully used, the connection is established by use of the transmission rate determined beforehand according to the wave intensity.

According to the technique described in document 1, the communication speed is increased using a single transmission rate for wireless communication. However, consideration has not been given to an operation to establish connection using a higher transmission rate by more effectively conducting the connection control for each transmission rate.

SUMMARY OF THE INVENTION

An exemplary purpose the present invention is to remove this difficulty, to provide a wireless communication system, a wireless base station, a transmission rate determining method, and a program for wireless communication system in which by more flexibly using the connection control for each transmission rate in the wireless base station, the connection being established using a higher transmission rate so long as the connection capacity of the wireless base station has a margin while efficiently determining a transmission rate according to the wave intensity from a wireless communication terminal.

To achieve the above purpose, there is provided a wireless communication system including wireless base stations each controlling wireless communication with wireless communication terminals, and a system control unit for conducting various control operations for the communication in the base stations, the system supporting a plurality of transmission rates. The wireless communication system includes a traffic judge module for determining whether traffic is equal to or less than a threshold value, a transmission rate determining module for determining a transmission rate for connection, and a determining method change module for changing, based on a result of the determination by the traffic judge module, a method of determining a transmission rate by the transmission rate determining module.

The determining method change module favorably changes a threshold value for the transmission rate determining module to determine a transmission rate.

It is desirable that the determining method change module changes the determining method for the transmission rate determining module to determine a higher transmission rate if the traffic judge module determines that traffic in the base station is equal to or less than a predetermined value.

Preferably, the transmission rate determining module determines a transmission rate according to electric wave intensity of a reception signal received from a wireless communication terminal.

The transmission rate determining module favorably determines a transmission rate according to a signal-to-noise ratio of a reception signal received from a wireless communication terminal.

In accordance with a second aspect of the present invention, there is provided a wireless base station for supporting a plurality of transmission rates and controlling wireless communication connection with a wireless communication terminal. The wireless base station includes a traffic judge module for determining whether traffic is equal to or less than a threshold value, a transmission rate determining module for determining a transmission rate for connection, and a determining method change module for changing, based on a result of the determination by the traffic judge module, a method of determining a transmission rate by the transmission rate determining module.

The determining method change module favorably changes a threshold value for the transmission rate determining module to determine a transmission rate.

Preferably, the determining method change module changes the determining method for the transmission rate determining module to determine a higher transmission rate if the traffic judge module determines that traffic in the base station is equal to or less than a predetermined value.

It is desirable that the transmission rate determining module determines a transmission rate according to electric wave intensity of a reception signal received from a wireless communication terminal.

The transmission rate determining module determines a transmission rate according to a signal-to-noise ratio of a reception signal received from a wireless communication terminal.

In accordance with a third aspect of the present invention, there is provided a transmission rate determining method for use with a wireless communication system including wireless base stations each controlling wireless communication with wireless communication terminals, and a system control unit for conducting various control operations for the communication in the base stations, the system supporting a plurality of transmission rates. The transmission rate determining method includes a traffic judge step of determining whether traffic is equal to or less than a threshold value, a determining method change step of changing, based on a result of the determination by the traffic judge step, a method of determining a transmission rate for connection, and a transmission rate determining step of determining a transmission rate according to the determining method determined by the determining method change step.

The determining method change step favorably includes changing a threshold value to determine a transmission rate for connection.

Desirably, the determining method change step includes changing the determining method for the transmission rate determining step to determine a higher transmission rate if the traffic judge step determines that traffic in the base station is equal to or less than a predetermined value.

Preferably, the transmission rate determining step includes determining a transmission rate according to electric wave intensity of a reception signal received from a wireless communication terminal.

It is desirable that the transmission rate determining step includes determining a transmission rate according to a signal-to-noise ratio of a reception signal received from a wireless communication terminal.

In accordance with a forth aspect of the present invention, there is provided a program for wireless communication system for use with a wireless communication system including wireless base stations each controlling wireless communication with wireless communication terminals, and a system control unit for conducting various control operations for the communication in the base stations, the system supporting a plurality of transmission rates. The program causes a computer to perform traffic judge processing for determining whether traffic is equal to or less than a threshold value, determining method change processing for changing, based on a result of the determination by the traffic judge processing, a method of determining a transmission rate for connection, and transmission rate determining processing for determining a transmission rate according to the determining method determined by the determining method change processing.

Preferably, the determining method change processing changes a threshold value to determine a transmission rate for connection.

It is desirable that the determining method change processing changes the determining method for the transmission rate determining processing to determine a higher transmission rate if the traffic judge processing determines that traffic in the base station is equal to or less than a predetermined value.

The transmission rate determining processing favorably determines a transmission rate according to electric wave intensity of a reception signal received from a wireless communication terminal.

Desirably, the transmission rate determining processing determines a transmission rate according to a signal-to-noise ratio of a reception signal received from a wireless communication terminal.

As above, in accordance with the present embodiments, by flexibly conducting the connection control for each transmission rate by the wireless base station according to the traffic, a possibly higher transmission rate can be used to establish connection so, long as the connection capacity of the base station has a margin while determining the efficient transmission rate according to the wave intensity from the wireless communication terminal.

BRIEF DESCRIPTION OF THE DRAWINGS

The purposes and features of the present invention will become more apparent from the consideration of the following detailed description taken in conjunction with the accompanying drawings in which:

FIG. 4 is a flowchart showing a communication connecting operation in the wireless communication system;

FIG. 5 is a diagram showing an example of a transmission rate decision table 24a.

DESCRIPTION OF AN EXEMPLARY EMBODIMENT

Referring next to the drawings, description will be given in detail of an embodiment in which a wireless communication system, a wireless base station, a transmission rate determining method, and a program for wireless communication system are applied to a wireless communication system implemented by use of a wireless LAN and a wireless communication terminals in the system.

Figure 1:
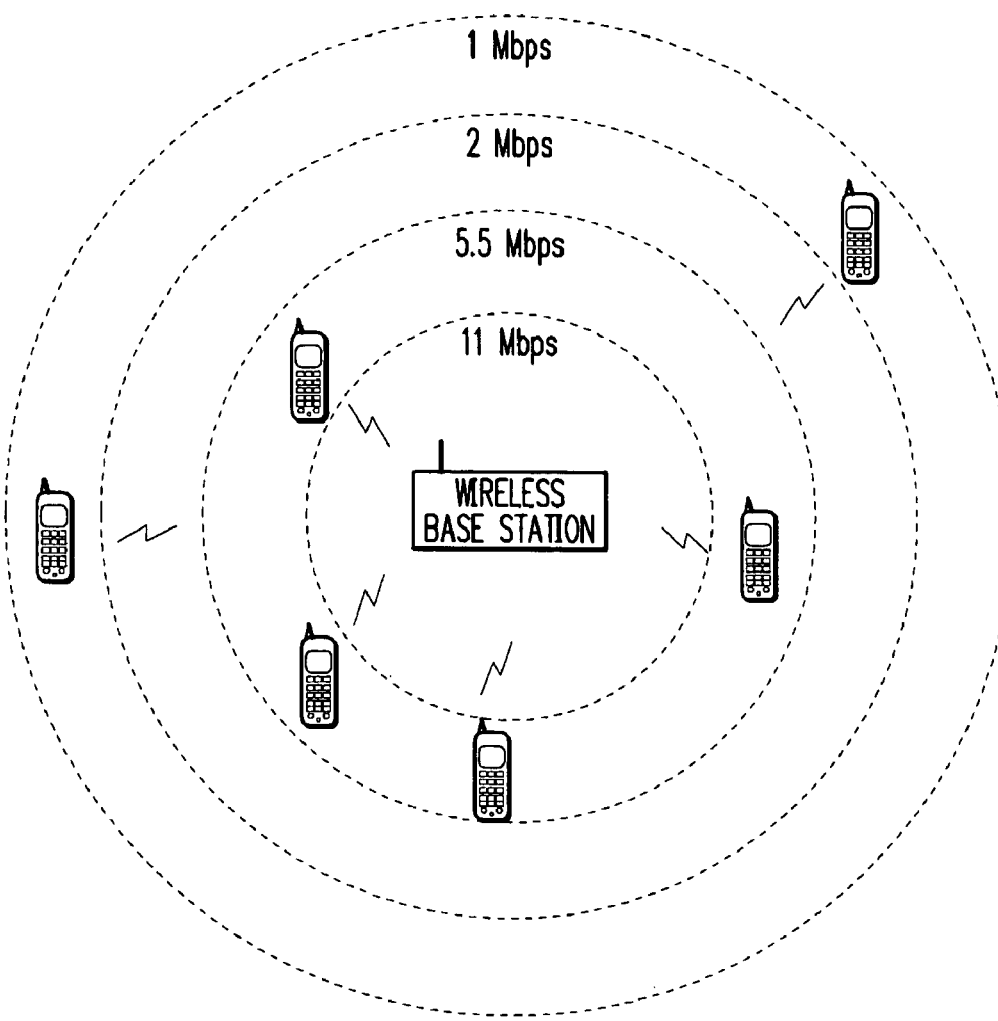
FIG. 1 is a diagram showing an example of allocation of transmission rates in the conventional wireless base station.
Figure 2:
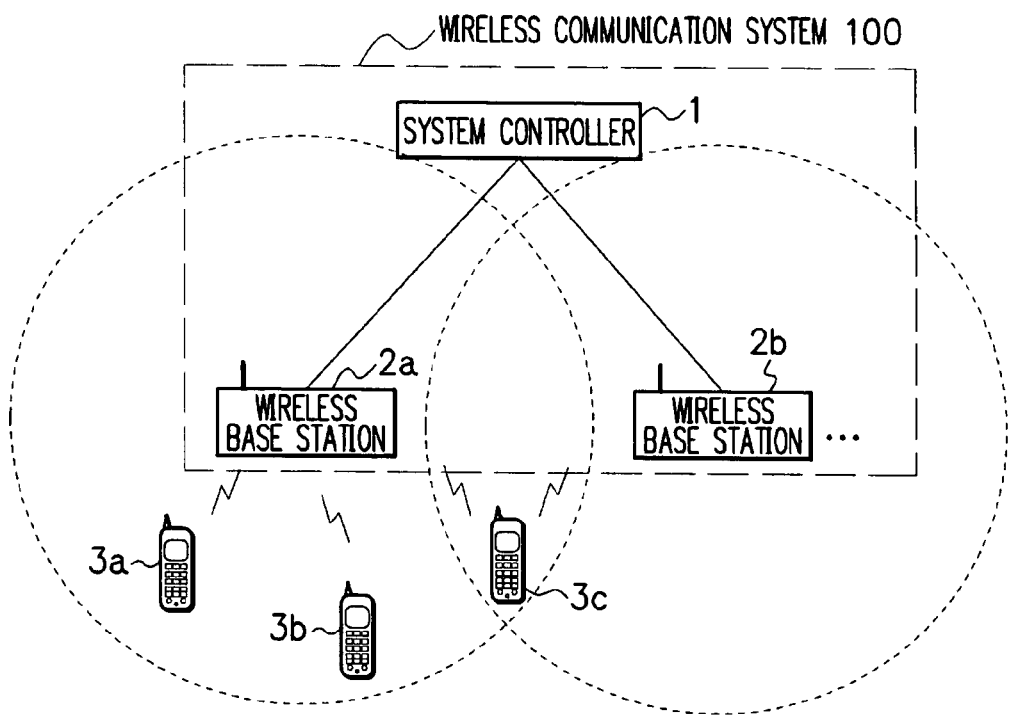
FIG. 2 is a block diagram showing an example of structure of a wireless communication system.

A wireless communication system 100 includes a system control unit 1, wireless base stations 2 (2a, 2b, and so on) or access points (AP) connected to the unit 1, and the base stations are communicable through wireless communication with wireless communication terminals 3 as shown in FIG. 2.

The unit 1 carries out various control operations for communication of the system 100, for example, handover between wireless base stations 2.

Figure 3:
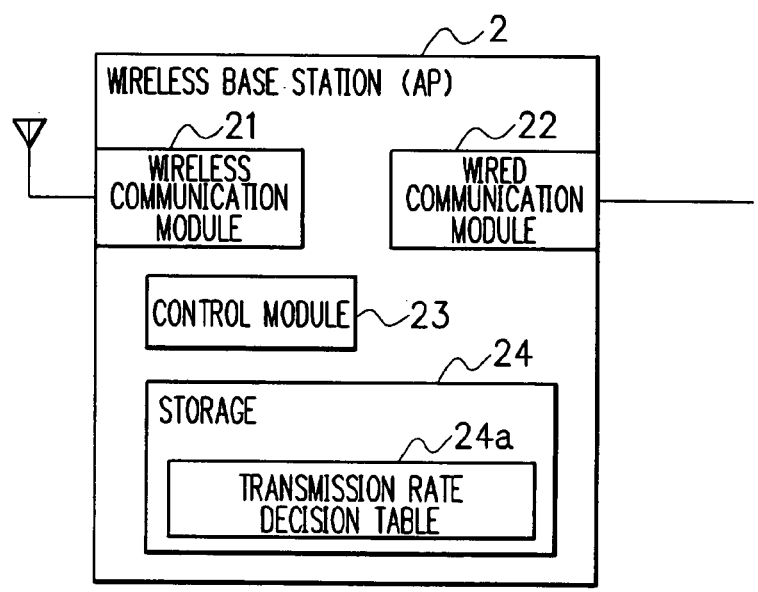
FIG. 3 is a block diagram showing an example of a configuration of a wireless base station 2 in the wireless communication system.

As can be seen from FIG. 3, a base station 2 includes a wireless communication module 21 to conduct radio communication with the terminals 3 and other devices, a wired communication module 22 to carry out wired communication with the unit 1 and the like, a control model 23 to generally supervise operation of the base station 2, and a storage section 24 to store a transmission rate decision table 24a and the like.

Referring next to the flowchart of FIG. 4, description will be given of an operation of the wireless communication system 100 to establish communication.

When a connection request is received from the terminal 3, the base station 2 obtains information indicating whether the communication traffic of the base station 2 is within a range such that the connection capacity of the base station 2 allows an additional wireless communication terminal to establish communication. That is, the base station 2 obtains information whether the communication traffic is equal to or less than a predetermined connectibility threshold value (step S1).

If the connection capacity of the base station 2 does not have room to additionally connect a wireless communication terminal while maintaining predetermined communication quality (no in step S1), the base station 2 rejects the connection request and disconnects the communication (step S2).

If such margin exists, that is, if the communication traffic is equal to or less than a predetermined margin value (yes in step S3), the base station 2 lowers a rate decision threshold value, which is used to determine a transmission rate for connection, by a predetermined value so that the connection is established at a transmission rate higher than the transmission rate determined by a default (initial) rate decision threshold value (step S4), and then establishes connection for the communication (step S6).

FIG. 5 shows an example of a transmission rate decision table 24a to determine a transmission rate for connection according to the intensity of signals from the terminal 3.

The control module 23 of the base station 3 acquires from the communication module 21 information of the intensity of the received signal and refers to the rate decision table 24a to determine a transmission rate corresponding to the wave intensity to establish the connection using the transmission rate.

If the control module 23 attains the information of the communication traffic as above and the connection capacity of the base station 2 has room to add one more terminal (yes in step S3), the control module 23 reduces the rate decision threshold value of the decision table 24a (a range of associated wave intensity values) to a predetermined value. Based on the resultant rate decision threshold value, the control module 23 determines a transmission rate corresponding to the wave intensity of the connection request signal (step S4) and then connects the communication using the transmission rate (step S6).

Although an additional terminal can be connected while the predetermined communication quality is maintained, if the connection capacity of the base station 2 does not have a margin for another terminal, that is, if the communication traffic is less than or equal to a connectibility threshold value indicating the connectibility range, but is equal to or more than a predetermined margin threshold value (no in step S3), the control module 23 selects a transmission rate corresponding to the wave intensity of the connection request signal by use of the initial rate decision threshold value in the decision table 24a (step S5) and then establishes the connection using the transmission rate (step S6).

Figure 6:
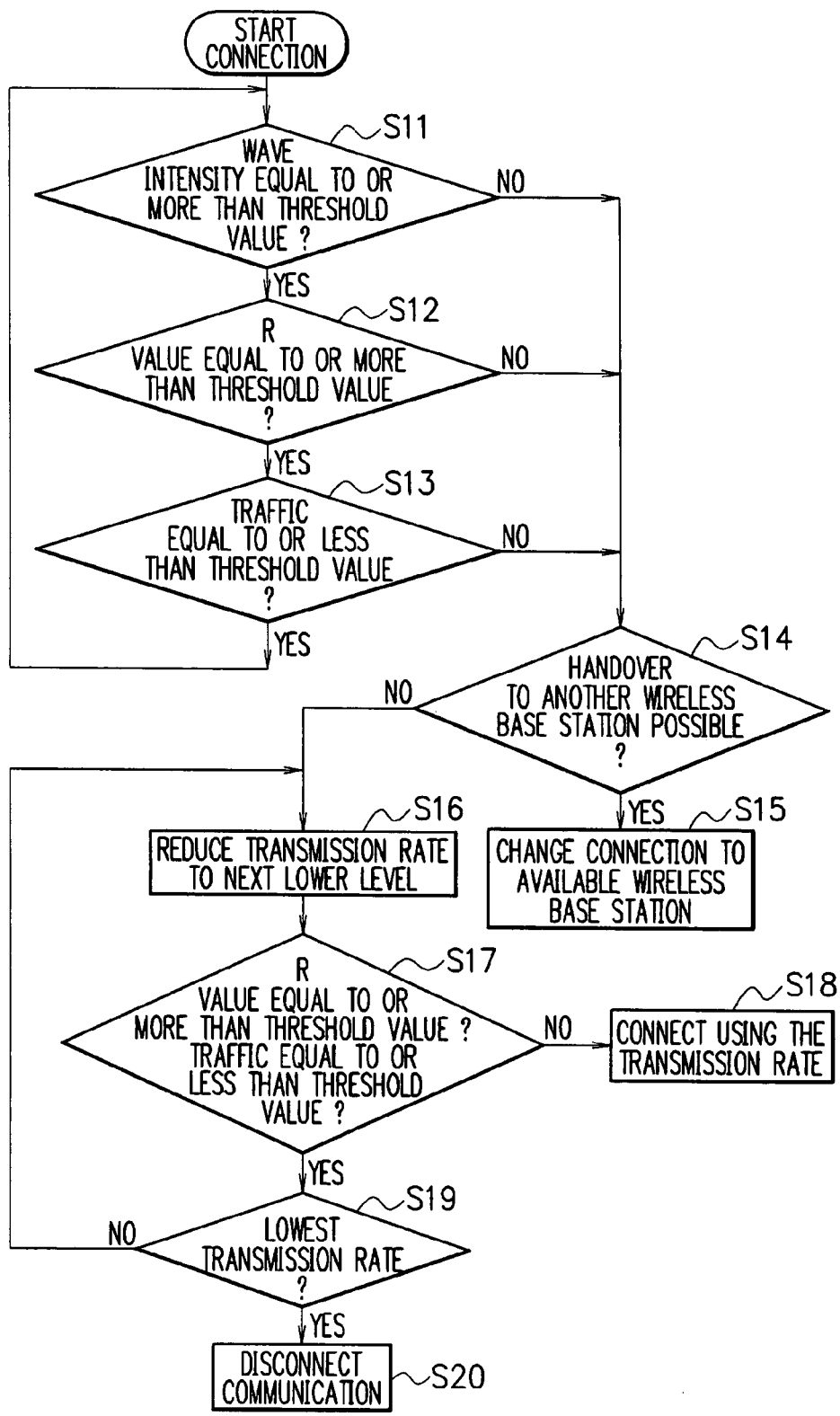
FIG. 6 is a flowchart showing an operation to connect communication after connection is established.

Referring now to the flowchart of FIG. 6, description will be given of an operation during the communication connection.

During the communication connection state, even after the terminal is connected, the controller 23 continuously attains from the communication module 21a wave intensity, an R value (calculated using sound quantity, delay, echo, or the like according to a calculation formula of E-model), and communication traffic for each wireless communication terminal.

If the wave intensity and the R value each are equal to or more than the predetermined quality threshold values and the traffic is equal to or less than a predetermined quality value, the base station 2 continues the communication (yes in steps S11, S12, and S13).

If either the wave intensity or the R value is less than the predetermined quality threshold value, or if the traffic is more than the predetermined quality value, the base station 2 issues a query to the system controller 1 to determine whether the wireless communication with the terminal 3 in the connected state can be handed over to a second wireless base station (step S14).

If there exists such second wireless base station 2, the communication is handed over to the second base station 2 (step S15).

Otherwise, the base station 2 selects a next lower transmission rate for a handover (steps S16 to S19). If the selected transmission rate meets the conditions of the threshold values described above, the base station 2 establishes communication at that transmission rate (steps S17 and 18). When even if the lowest transmission rate does not satisfy the conditions (yes in step S19), the base station 2 disconnects the communication with the terminal 3 (step S20).

As above, the number of terminals associated with the base station 2 is not fixed, and the decision whether to establish connection is based on whether the predetermined communication quality is obtained. Therefore, the base station 2's ability of simultaneous connections can be flexibly utilized. The simultaneous connection capacity of the base station 2, which has been wasted so far, is effectively used and a larger number of wireless communication terminals can be simultaneously coupled with the base station 2.

In addition, if the connection capacity of the base station 2 has a margin for one more wireless communication terminal, the base station 2 lowers the threshold value by a predetermined value in the rate decision table 24a. Therefore, the base station 2 can flexibly conduct the connection control to each transmission rate and can use a possibly higher transmission rate so long as the connection capacity of the base station 2 has a margin while efficiently determining the transmission rate according to the wave intensity from the wireless communication terminal 3.

As described above, by using information and communication data in the system received by the wireless base station 2, it is possible to automatically determine the number of calls and the communication band that are required to secure the quality of sound and voice automatically in accordance with a situation.

The embodiments described above are only exemplary embodiments. The present invention is not restricted by these embodiments. The embodiments can be modified and changed in various ways according to technological ideas of the present invention.

For example, in the description of the embodiments the transmission rate is determined on the basis of the wave intensity of received signals. However, any judge criterion may be employed only if it is possible to determine according to the criterion whether a favorable communication state is obtained. For example, there may be adopted a configuration in which the transmission rate is determined on the basis of the Signal to Noise Ratio (SNR).

In addition, in the description of the embodiments, the R value is employed as the reference to judge the quality of sound and voice. The judge reference is not restricted by this embodiment. A desired judge reference may be used only if the quality of sound and voice can be determined according to the judge reference. For example, PESQ defined by ITU-T P.862, which is a test for higher quality of sound and voice, may be adopted.

In the description of the embodiments, the decisions "whether an additional terminal is connectible (step S1)" and "whether a sufficient margin of connection capacity still exists after one terminal is connected" are made according to the traffic in the wireless base station 2. However, there may be employed a configuration in which the determination is conducted according to the traffic of each transfer rate supported by the base station 2.

In this case, considering the transfer rate determined according to the wave intensity and the default threshold value in the transmission rate decision table 24a, and at least one higher transmission rate, the base station 2 analyzes the traffic at the point of determination. If it is determined that the connection capacity of the base station 2 has a margin, the base station 2 conducts the operation of step 4 in which the threshold value of the decision table 24a is lowered by a predetermined value to determine the transmission rate.

Although wired communication is assumed between the system control unit 1 and the wireless base station 2 in the above embodiments, any scheme may be employed only if communication is established. For example, wireless communication may be used.

The modules and functions arranged in the wireless base station 2 in the embodiments may be implemented by the whole wireless communication system 100. For example, the system control unit may include the modules and functions. Or, the modules and functions may be realized through cooperation of the system control unit and the wireless base station.

Also, in the description of the embodiments, wireless base stations are connected to one system control unit. However, as long as a handover is conducted between wireless base stations, a system configuration is not limited to the above embodiments. The present invention is similarly applicable even to a configuration including a plurality of system control units and wireless base stations coupled with each of the system control units.

It is also possible that a program to implement the processing procedures for the wireless communication system is recorded in a recording medium. The recording medium is installed in a computer of the wireless communication system such that the functions of the embodiments are implemented when the program is executed by the Central Processing Unit (CPU) of the computer.

Information items including the program may be supplied to an output device from a recording medium or from an external recording medium via a network.

That is, the program code read from the recording medium executes the novel functions of the present invention. The recording medium having recorded the program code and the signals read from the recording medium are included in the scope of the present invention.

The recording medium may be, for example, a floppy (registered trademark) disk, a hard disk, an optical disk, a magnetooptical disk, a Compact Disk-Read Only Memory (CD-ROM), a magnetic tape, a nonvolatile memory card, an ROM, or an Electrically Erasable Programmable ROM (EPPROM).

By use of the program in accordance with the present embodiments, the wireless communication system and the wireless base stations controlled by the program can achieve the functions of the wireless communication system of the embodiments.

While the present invention has been described with reference to the particular illustrative embodiments, it is not to be restricted by the embodiment but only by the appended claims. It is to be appreciated that those skilled in the art can change or modify the embodiments without departing from the scope and spirit of the present invention.

While the invention has been described in terms of several exemplary embodiments, those skilled in the art will recognize that the invention can be practiced with modification within the spirit and scope of the appended claims.

Further, it is noted that Applicant's intent is to encompass equivalents of all claim elements, even if amended later during prosecution.

What is claimed is:

1. A wireless base station for supporting a plurality of transmission rates and controlling wireless communication with a wireless communication terminal, comprising:
    a traffic judge section that determines whether traffic is equal to or less than a connectability threshold value;
    a transmission rate determining section that determines a transmission rate for connection, wherein:
    if the traffic is equal to or less than a predetermined margin value, then the base station lowers a rate decision threshold value from a default rate decision threshold value, and
    if the traffic is greater than the predetermined margin value, then the base station uses the default rate decision threshold value; and
    a method determining section that changes, based on a result of the determination by the traffic judge section, a method of determining the transmission rate by the transmission rate determining section,
    wherein the traffic judge section determines whether the traffic is greater than a traffic quality threshold value and an R value, employed as a reference of a quality of sound, is less than an R quality threshold value, and
    wherein the rate decision threshold value sets the transmission rate based on a wave intensity of a signal received from the wireless communication terminal, such that a lower rate decision threshold value results in a higher transmission rate.

2. The wireless base station in accordance with claim 1, wherein the wave intensity comprises an electric wave intensity and the signal received comprises a reception signal received from the wireless communication terminal.

3. The wireless base station in accordance with claim 1, wherein the transmission rate determining section determines a transmission rate according to a signal-to-noise ratio of a reception signal received from a wireless communication terminal.

4. A transmission rate determining method for use with a wireless communication system comprising wireless base stations each controlling connection for wireless communication with wireless communication terminals, and a system control unit for conducting various control operations for the communication in the base stations, the system supporting a plurality of transmission rates, the method comprising:
    a traffic judge step of determining whether traffic is greater than a traffic quality threshold value and an R value, employed as a reference of a quality of sound, is less than an R quality threshold value for each wireless communication terminal;
    a determining method change step of changing, based on a result of the determination by the traffic judge step, a method of determining a transmission rate for connection; and
    a transmission rate determining step of determining a transmission rate according to the determining method determined by the determining method change step,
    wherein if the traffic is equal to or less than a predetermined margin value, then the base station lowers a rate decision threshold value from a default rate decision threshold value,
    wherein if the traffic is greater than the predetermined margin value, then the base station uses the default rate decision threshold value, and wherein the rate decision threshold value sets the transmission rate based on a wave intensity of a signal received from the wireless communication terminal, such that a lower rate decision threshold value results in a higher transmission rate.

5. The transmission rate determining method in accordance with claim 4, wave intensity comprises an electric wave intensity and the signal received comprises a reception signal received from a wireless communication terminal.

6. The transmission rate determining method in accordance with claim 4, wherein the transmission rate determining step comprises determining a transmission rate according to a signal-to-noise ratio of a reception signal received from a wireless communication terminal.

7. The wireless base station in accordance with claim 1, wherein the rate decision threshold value is contained in a table comprising a plurality of rate decision threshold values, the rates decision threshold values correlating a plurality of wave intensity ranges with a plurality of transmission rates.

* * * * *